(12) United States Patent
Schütz

(10) Patent No.: US 9,751,471 B2
(45) Date of Patent: Sep. 5, 2017

(54) DEVICE FOR HOLDING A CAMERA HAVING A SLOTTED GUIDE

(71) Applicant: Huf Hülsbeck & Fürst GmbH & Co. KG, Velbert (DE)

(72) Inventor: Heiko Schütz, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 113 days.

(21) Appl. No.: 14/434,106

(22) PCT Filed: Oct. 9, 2013

(86) PCT No.: PCT/EP2013/071083
§ 371 (c)(1),
(2) Date: Apr. 8, 2015

(87) PCT Pub. No.: WO2014/056996
PCT Pub. Date: Apr. 17, 2014

(65) Prior Publication Data
US 2015/0258945 A1    Sep. 17, 2015

(30) Foreign Application Priority Data

Oct. 10, 2012 (DE) .................. 10 2012 109 610

(51) Int. Cl.
*G03B 17/00* (2006.01)
*B60R 11/04* (2006.01)
(Continued)

(52) U.S. Cl.
CPC ............... *B60R 11/04* (2013.01); *B60R 1/00* (2013.01); *G08B 13/19619* (2013.01);
(Continued)

(58) Field of Classification Search
CPC ........... G03B 17/00; G03B 17/56; H04N 7/18
(Continued)

(56) References Cited

U.S. PATENT DOCUMENTS

2009/0231430 A1*  9/2009  Buschmann ......... B60Q 1/0023
                                              348/148
2009/0309971 A1* 12/2009  Schuetz ................. B60R 11/04
                                              348/148
2012/0230664 A1*  9/2012  Pavithran ............. H04N 5/2253
                                              396/89

FOREIGN PATENT DOCUMENTS

DE    102007052402    5/2009
DE    102009008281    8/2010
(Continued)

OTHER PUBLICATIONS

International Search Report and the Written Opinion Dated Nov. 21, 2013 From the European Patent Office Re. Application No. PCT/EP2013/071083 and Its Translation Into English.

*Primary Examiner* — Clayton E Laballe
*Assistant Examiner* — Fang-Chi Chang

(57) ABSTRACT

The invention relates to a device for holding a camera (40) which serves in particular as a parking assistance device for a motor vehicle, comprising a housing (10) in which a slide (20) is movably accommodated to which slide the camera (40) can be secured. The slide (20) can be driven by a mechanism (30) having an arm (40) that is rotatably mounted in the housing (10) about a first axis (1) and that is mechanically functionally connected to a rocking element (50). Said rocking element is rotatably mounted in the housing (10) about a second axis (2) and the slide (20) is rotatably mounted on the rocking element (50) about a third axis (3), the movement of the slide (20) between a rest position (A) and an operating position (B) being at least to some extent defined by a housing guide (14) of the housing (10).

19 Claims, 4 Drawing Sheets

(51) Int. Cl.
*B60R 1/00* (2006.01)
*G08B 13/196* (2006.01)
*H04N 5/225* (2006.01)
*B60R 11/00* (2006.01)

(52) U.S. Cl.
CPC ..... *G08B 13/19632* (2013.01); *H04N 5/2252* (2013.01); *H04N 5/2253* (2013.01); *B60R 2011/004* (2013.01); *B60R 2011/0082* (2013.01); *B60R 2300/806* (2013.01)

(58) Field of Classification Search
USPC ............... 396/419, 427; 348/143; 248/177.1
See application file for complete search history.

(56) References Cited

FOREIGN PATENT DOCUMENTS

| | | |
|---|---|---|
| DE | 102009015610 | 10/2010 |
| WO | WO 2012/107277 | 8/2012 |
| WO | WO 2012/107547 | 8/2012 |
| WO | WO 2014/056996 | 4/2014 |

* cited by examiner

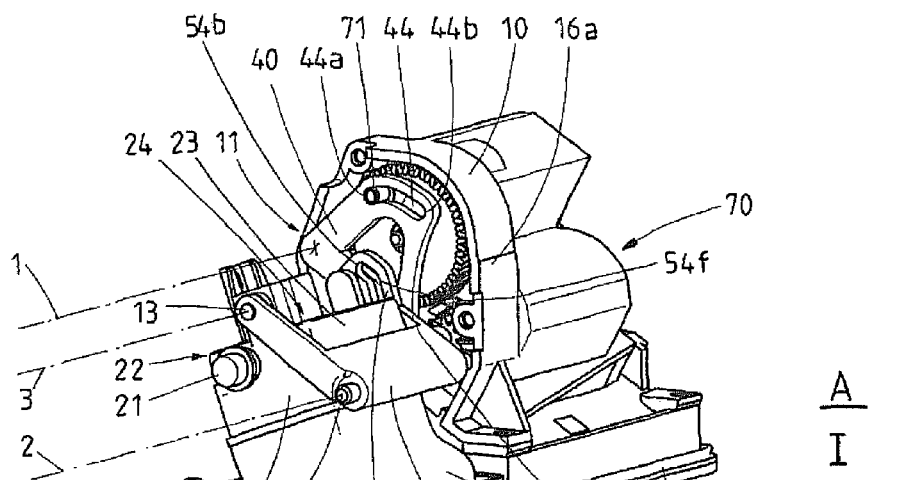
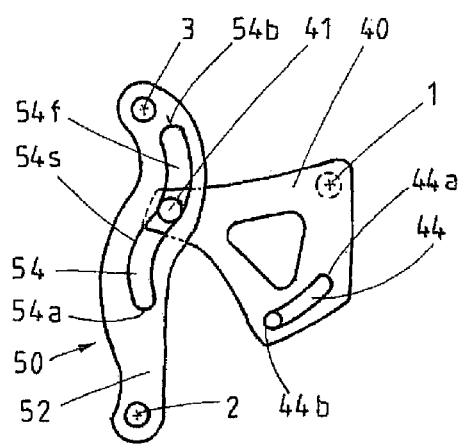
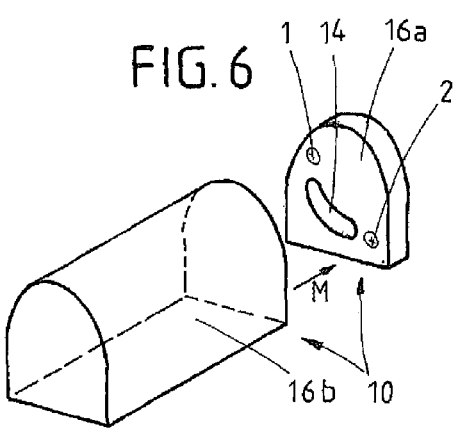
FIG. 1
FIG. 5
FIG. 6

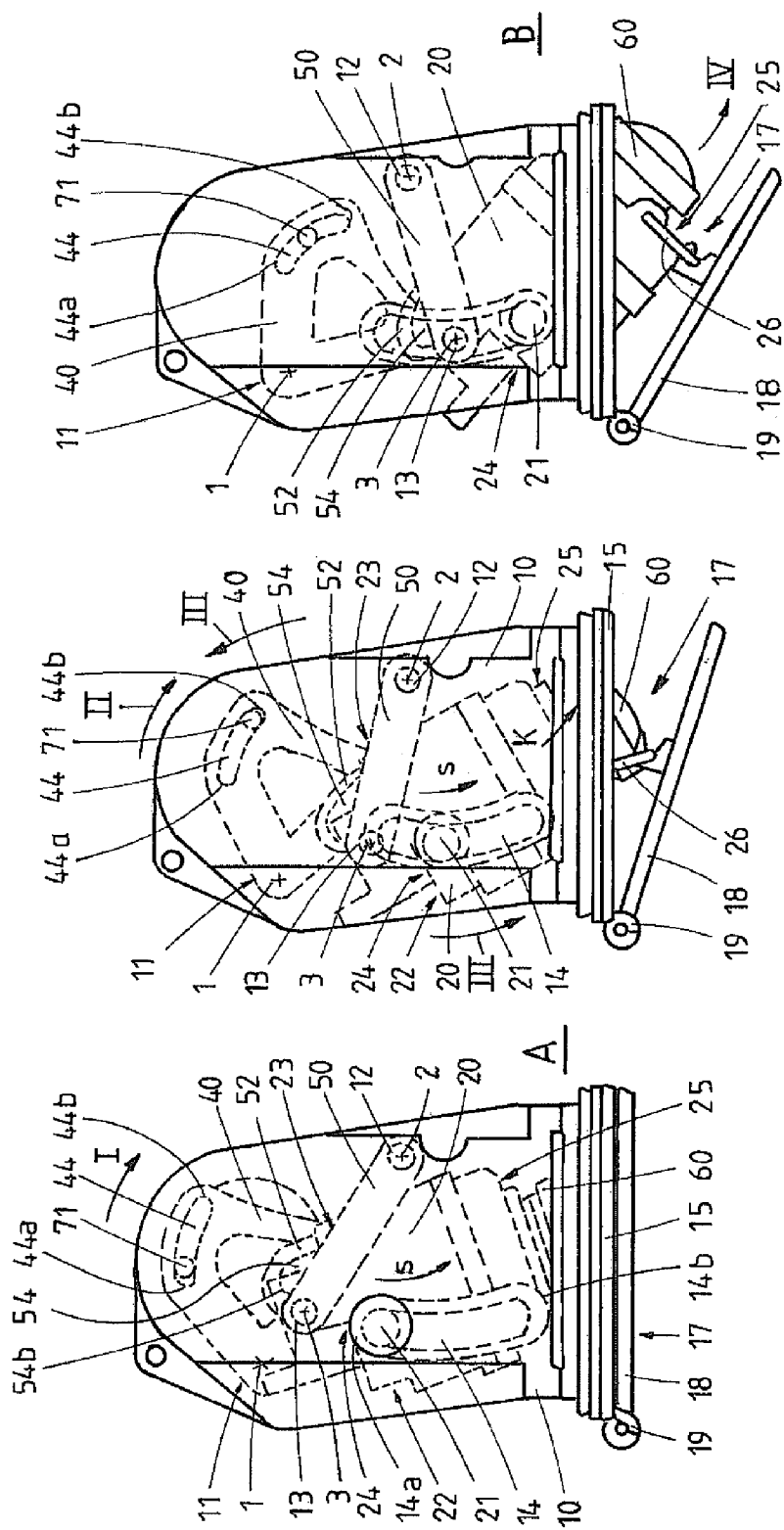

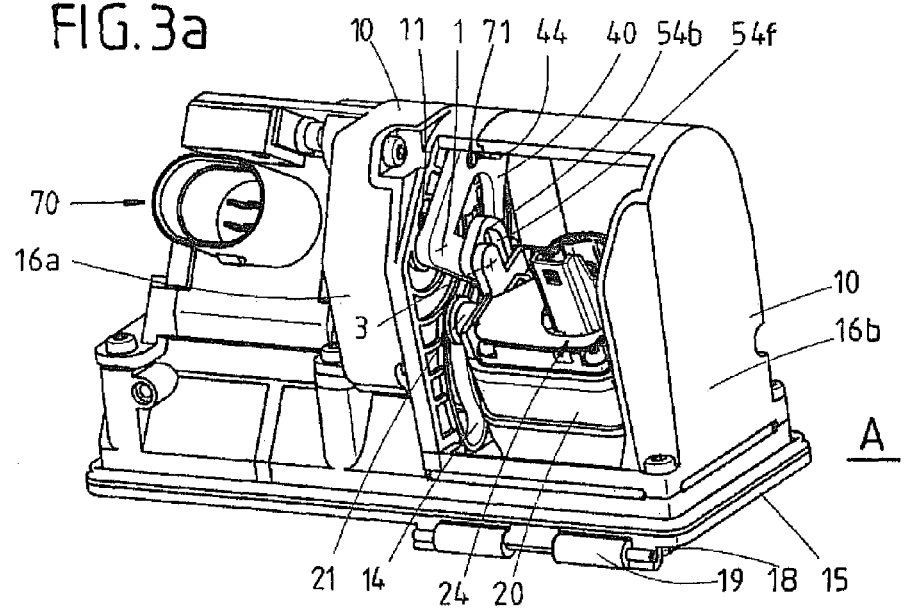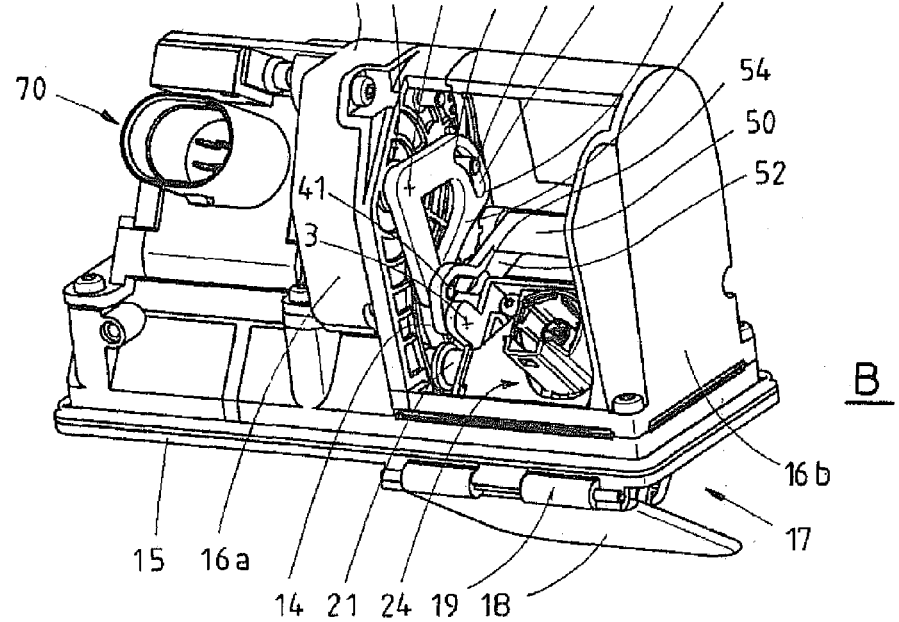

DEVICE FOR HOLDING A CAMERA HAVING A SLOTTED GUIDE

RELATED APPLICATIONS

This application is a National Phase of PCT Patent Application No. PCT/EP2013/071083 having International filing date of Oct. 9, 2013, which claims the benefit of priority of German Patent Application No. 10 2012 109 610.4 filed on Oct. 10, 2012. The contents of the above applications are all incorporated by reference as if fully set forth herein in their entirety.

FIELD AND BACKGROUND OF THE INVENTION

The invention relates to a device for holding a camera which can particularly serve as a parking assistance of a vehicle. The device comprises a housing in which the camera can be replaceably received, and a gear which serves for moving the camera between a rest position and an operating position.

Devices with a camera which serve for the image acquisition of the external area of the vehicle are already known from the state of the art. Such devices comprise a housing in which a camera is moveably received between a rest position and an operating position. For example, such cameras can be used in the area of the assisted parking of vehicles. If, for example, the reverse gear of the vehicle is used, the camera proceeds from the rest position in the operating position wherein the camera at least partially extends out of the housing. Thereby, the area behind the vehicle is visually captured by the camera and shown on a display for the driver of the vehicle. If the reverse drive is ended and the driver removes the reverse gear, the camera can be moved back from the operation position into the rest position.

In DE 10 2009 015 610 A1 a device with a permanently integrated camera is disclosed which serves for the image acquisition of the external area of the vehicle. The camera is thereby moveably received in a housing between a rest position and an operating position, wherein the housing is provided with a slotted guide for guiding the movement of the camera, in which a sliding element connected to the camera is guided. Thereby the disadvantage has occurred that the device can only receive a certain camera, so that the maintenance and the exchange of the camera are complicated. The device further discloses a lid element for the protection of the camera in the rest position, wherein the lid element is permanently assembled at the camera. Herein, it is a disadvantage that during an accident, when the lid element is damaged, the camera can be likewise damaged. Moreover, it is a disadvantage that the device is construction-wise assembled in a complicated manner, requiring many components and a great construction space. Therefore the production and the assembly of such devices are complicated and expensive.

SUMMARY OF THE INVENTION

Therefore, the object of the present invention is to create a simple, cost-efficient and compact device for the acceptance of a camera and a method for the simple assembly of the device which avoids the previously described disadvantages. Particularly, the device should be able to accept different cameras, enable an effective protection of the camera unit, comprise few construction elements and a small construction space and can be easily assembled.

This object is solved according to the invention by a device with all features of the independent claim 1. The invention hereby provides that the device comprises a slide which can replaceably accept different cameras, and that the slide is moved using a gear which gear comprises an arm and a rocking element which are jointly assembled at a housing and are in a mechanic operative connection to one another. The inventive idea is thereby that the slide is jointly connected with the rocking element and the movement of the slide between a rest position and an operating position can at least partially be determined by a housing guidance of the housing.

As an advantage the slide can comprise a housing-side mounting opening in order to replaceably receive a camera. Through the mounting opening the camera can be inserted and removed in a simple manner. Moreover the mounting opening can be configured for the acceptance of different camera models. The mounting opening can moreover be configured in a way that in the mounted state the camera is reliably received in the slide via a form and/or force fit. Further, the slide can comprise latching and/or clamping elements in the mounting opening which can interact with complementary retaining elements of the camera so that the camera can be securely assembled in the slide. Further, the slide can be configured with an outside-facing acceptance opening through which the camera can be directed towards the outside. Through the opening an objective of the camera can visually record the external area of the vehicle in an operating position of the slide.

According to the present invention the first arm can be assembled at the housing by a first joint and the rocking element can be assembled at the housing via a second joint. Herein the first axis can proceed through the first joint and the second axis through the second joint. The first and the second axis which can be immobile or rigidly assembled at the housing determine the rotation or swing axes of the arm and the rocking element and enable a secure and stable guidance of the arm and the rocking element and therewith of the slide for the camera. The movement of the arm and the rocking element and the slide can thereby be limited on the left and on the right side by the joints wherein the rocking arms of the rocking elements are moved on the levels which proceed vertical to the first and second axis through the first and second joint. When the arm and the rocking element conduct stable swinging movements, the slide likewise experiences a stable swinging movement between the rest position and the operating position. Moreover, the movement of the slide can be secured in a way that the housing according to the invention can comprise two plane parallel walls which can each be configured with a housing guidance which at least partially determine the movement of the slide.

According to the invention the first axis can be immobile or rigidly assembled at the housing about which the arm can be moved. The second axis can likewise be immobile or rigidly assembled at the housing about which the rocking element can be moved. Construction-wise the first axis can proceed parallel to the second axis. This assembly of the first and second axis enables that the slide can be stably moved between the rest position and the operating position. Thereby, the slide can be moved parallel to the level in which the first and the second joint and the guidance of the housing are assembled.

According to a particular advantage the gear can comprise a third movable axis at the rocking element about which the slide can be moved. Thereby, the slide can be assembled via a third joint at the rocking element, wherein particularly the third axis can proceed through the third joint. According to the invention the gear can be assembled in a way that the third axis can be moved parallel to the first axis and to the second axis during the movement of the slide. According to the invention the third axis can be moved along with the rocking element about the second axis. Thus, the slide cannot only be moved with the rocking element about the second axis, but can also be tilted about the third axis, which is determined by the third joint. The slide can thereby at least partially perform a swing and tilting movement at the same time. Thus, it can be achieved that the necessary construction space for the assembly or for guidance of the slide and therewith the camera, is minimized. Thereby, it is a particular advantage that the construction space of the device is considerably reduced for the acceptance of the camera.

According to the invention the slide can comprise a sliding element which can be movable along the housing guidance of the housing wherein particularly the housing guidance can be shaped arch-like. Thereby the guidance can interact with a sliding element of a gear in order to stabilize the movement of the rocking element, particularly about the first axis. The guidance can be configured as an opening in the housing wall and/or in a slotted guide and/or as a track inside at the housing wall. Advantageously, the sliding element can be configured as a cam which is displaced in the guidance. According to a particular advantage the sliding element can comprise a cog which can be pivotably moved in the guidance in order to minimize friction losses and optimize the drive effect of the gear.

The arm according to the invention can be configured with a drive guidance which interacts with a drive element of a gear in order to move the arm about the first axis. Herein the drive guidance can be shaped arch-like. Advantageously, the drive can serve for operating the gear. For this purpose according to the invention a cod-wheel drive can be intended. The drive can influence the arm via the drive element. The arm which is in a mechanic operative connection with the rocking element can transmit the drive effect to the rocking element and therewith to the slide in order to move the slide.

Advantageously, the rocking element can comprise a steering guidance, which can interact with a steering element of the arm in order to move the rocking element about the second axis and the slide about the third axis. According to a particular advantage it is intended that the steering guidance is configured S-like. Advantageously, thereby the steering element of the arm can slide about the first axis along a part of the arch-like steering guidance during the swinging movement of the arm which resembles a pitch circle with the center in the first joint and with the radius which corresponds to the length of the arm. Thereby, the swinging radius increases with which the rocking element moves about the second axis. If the steering element slides further in the steering guidance in a further part of the arch-like steering guidance, a tilting movement of the slide can be enforced, while the rocking element further moves with an increasing swinging radius about the second axis which swinging radius can be determined from the position of the steering element in the steering guidance. Advantageously, it can thereby be achieved that the slide cannot only be moved with the sliding element about the second axis but can be tilted further in the direction of the operating position about the third movable axis.

The inventive idea is thereby that the gear can be configured in a way that the slide can perform partly a swinging movement about the second axis and partly a tilting movement about the third axis. Hereby the swinging movement from the rest position into the operating position can be performed with an alterable radius which can be determined by the steering guidance. Thus, it is advantageously ensured that the construction space can be significantly reduced which is necessary for the storage and for the guidance of the slide. By unrolling of the sliding element in the housing guidance it can moreover be ensured that the slide can be securely and stably moved by the gear between the rest position and the operating position.

Advantageously, in the first drive phase the drive element can be moved from a housing-side stop to a gear-side stop of the drive guidance without actuating the gear. Subsequently, in the second drive phase the drive element can influence the gear-side stop in a way that the steering element can be moved from a lower stop of the steering guidance to an upper peak. Thereby the sliding element of the slide can be moved along a housing guidance from a posterior stop to the center of the housing guidance. Moreover, in the third drive phase the steering element can interact with the steering guidance in a way that the steering element can be moved from an upper peak of the drive guidance to a lower peak. At the same time the guiding element in the drive guidance can be moved backwards from a guidance-side stop in the direction to a housing-side stop. Herein the sliding element can be moved along a guidance from the center of the guidance to an anterior stop. Finally the steering element can interact in the fourth drive phase with the steering guidance in a way that the steering element can be moved from a lower peak of the steering guidance to an upper peak that the drive element can be moved further backwards in the direction of the housing-side stop to a center of the drive guidance. Thereby, the sliding element can rest at the anterior stop of the housing guidance while the slide can be moved or tilted about the third axis further in direction of the operating position. It can be advantageously intended that the gear, particularly the steering element, can engage in the operating position of the slide in the steering guidance. Thus, the slide can be securely hold in the operating position in order to move the slide again wherein a drive force is needed in order to run through the drive process in a reverse direction and to bring the slide into the rest position.

It can be intended that the gear is assembled in a way that during the tilting movement the swinging movement of the slide is blocked about the second axis. Thereby the slide can be moved about the second axis in a first movement phase and subsequently be tilted in the second movement phase in the direction of the operating position. Alternatively it is possible that the gear is configured in a way that the tilting movement and the swinging movement can at least partially occur at the same time. Thereby, the slide can perform an arch-like swinging movement and at the same time tilt a bit forward in the operating position which minimizes the movement space of the slide and therewith the construction space of the device.

Advantageously, the housing can comprise an opening through which the slide can extend in the operating position. Further, a lid element can be intended that in the rest position can close the opening of the slide. The lid element can be assembled underneath the manufacturer sign at the rear end of the vehicle or can be the manufacturer sign itself. The lid element can thereby cover and protect the camera in the rest position. Further, the lid element can fulfill a sealing function.

According to the invention a protecting membrane can be intended which can seal the free space between the opening in the housing and the slide in order to avoid the penetration of dirt particles and moisture into the housing and protect the camera from weather influences. The protecting membrane can be configured in form of a bellow membrane, particularly tube-like. Thereby, one edge of the bellow-shaped protecting membrane can be assembled at the edge of the opening outside of the housing. This edge of the protecting membrane can thereby be assembled or clamped between the edge of the opening and the housing lid via a form and/or force fit and/or can be glued on the edge of the opening. The second edge of the bellow-like protecting membrane can be assembled at the outside at an opening, particularly the recess opening of the slide. This edge of the protecting membrane can be hold via a clamping ring at the edge of the opening and/or can be glued at the edge of the opening. The protecting membrane can thereby be configured from an elastic material. During the movement of the slide the protecting membrane can be deformed. Advantageously, the membrane sealingly closes the opening in the housing, so that no dirt or moisture can penetrate into the housing and damage the camera.

Further, it can be intended that the opening is configured with a collar element at which the lid element can noislessly abut and if necessary absorb when the slide is in the rest position wherein particularly the collar element is configured from an elastic material.

The housing of the device and/or the gear and/or the slide and/or the rocking elements can be configured from a random plastic, metal or the like, which particularly comprises a higher hardness than the material of the protecting membrane and/or the collar element.

Advantageously it can be intended that the lid element does not need a particular drive. According to the invention the lid element can be pushed open by the camera during the movement from the rest position into the operating position in an opening position regarding the camera. Back in the closing position the lid can fall down by the effect of its own gravity and/or can be tightened by a connecting element at the slide. The slide can thereby be in a mechanical operative connection with the lid element in a way that during the movement between the rest position and the operating position the slide moves along with the lid element between the open position and the closing position. Hereby it can be intended that the slide comprises at least one pestle and/or the slide can be connected with the lid element in a form and/or force fitting way.

Advantageously, the lid element can be pivotably and/or detachably assembled at the housing via a swivel joint and/or form fittingly and/or force fittingly. Herewith, it is ensured that the lid element can be pushed open and/or can be pulled back via the camera or the slide without being driven. Only a pivotable connection of the lid element with the housing is necessary. Further, the lid can be performed removable or detachable. Therewith, a particular advantage is achieved that in case of a collision with another vehicle or object, the lid element is damaged or can fall off, however, the camera is not damaged by the influence on the lid element. If the lid element remains in an open position, no danger occurs for the interior of the device and it only falls off with a mechanical influence on the lid element.

Further, the object of the present invention is solved through a method with all features of the method claim for the mounting of a device which serves for the acceptance of a camera which can for example be used as a parking assistance of a vehicle. The device can comprise a housing in which a slide can be movably received at which the camera can be assembled. Thereby the housing can comprise at least a first and a second housing part. For guiding of the slide between the rest position and the operating position a gear is intended which comprises an arm which can be movably mounted about a first axis at the housing and can be in a mechanical operative connection with a rocking element which can be movably mounted about a second axis at the housing. Further, the slide can be movably mounted about a third axis at the rocking element wherein the movement of the slide between a rest position and an operating position can be at least partially determined through a housing guidance of the housing. The mounting of the device according to the invention can comprise the following steps in any order:

In a first step, the gear and the slide can be guided in a first mounting direction towards the inside of the first housing part and can be assembled at the inside of the first housing part. In a second step, the second housing part can be guided in the first mounting direction towards the first housing part and with the second housing part be assembled in a way that a swinging and/or tilting movement of the slide can be performed between the rest position and the operating position. The mounting of the device can thereby be simplified in a way that all components of the gear and the slide are assembled for the acceptance of the camera at a housing part, particularly a wall of the housing. Not until that the second housing part can be assembled at the first housing part in a way that the gear and the slide according to the invention are protectively covered by the housing. According to the invention it can be intended that the first and second step can be performed sequentially. Alternatively, it can be intended that the first and second step can at least partially occur at the same time.

In a further third step the housing lid can be assembled at the first and/or on the second housing part which is directed to the outside from the vehicle interior in order to protect the gear, particularly the drive, and the camera assembled within the slide from mechanic influences from the outside.

In a step according to the invention a protection membrane can be assembled at the slide wherein the protection membrane can be assembled between the housing lid and at least one of both housing parts. The protection membrane can be configured in form of a bellow membrane, particularly tube-like. Thereby, one edge of the bellow-like protection membrane can be assembled at an edge of the opening outside at the housing or the housing lid. This edge of the protecting membrane can thereby be assembled or clamped between the housing lid and with one or both housing parts via a form and/or force fit and/or can be glued on the edge of an opening of the housing lid.

BRIEF DESCRIPTION OF THE SEVERAL VIEWS OF THE DRAWINGS

According to the invention the features of the description of the device according to the invention and the method according to the invention can be essential for the invention single by themselves or in different combinations. Further methods improving the invention are subsequently described in detail together with the description of the preferred embodiments of the invention. It is shown:

FIG. 1 a device according to the invention in a perspective view,

FIG. 2a a lateral view of the device according of the invention in the rest position of the slide, FIG. 2b a lateral view of the device according to the invention in a position between the rest position and the operating position of the slide, FIG. 2c a lateral view of the device according to the invention in an operating position of the slide, FIG. 3a a perspective view of the device according to the invention in the rest position of the slide, FIG. 3b a perspective view of the device according to the invention in an operating position of the slide, FIG. 4a a perspective view of the device according to the invention in a rest position of the slide from another point of view as in FIG. 3a and FIG. 3b, FIG. 4b a perspective view of the device according to the invention in an operating position of the slide from the point of view of FIG. 4a, FIG. 5 a schematic drawing of the arm according to the invention and a rocking element according to the invention, and FIG. 6 a schematic drawing of the housing according to the invention.

DESCRIPTION OF SPECIFIC EMBODIMENTS OF THE INVENTION

Figure 4A:
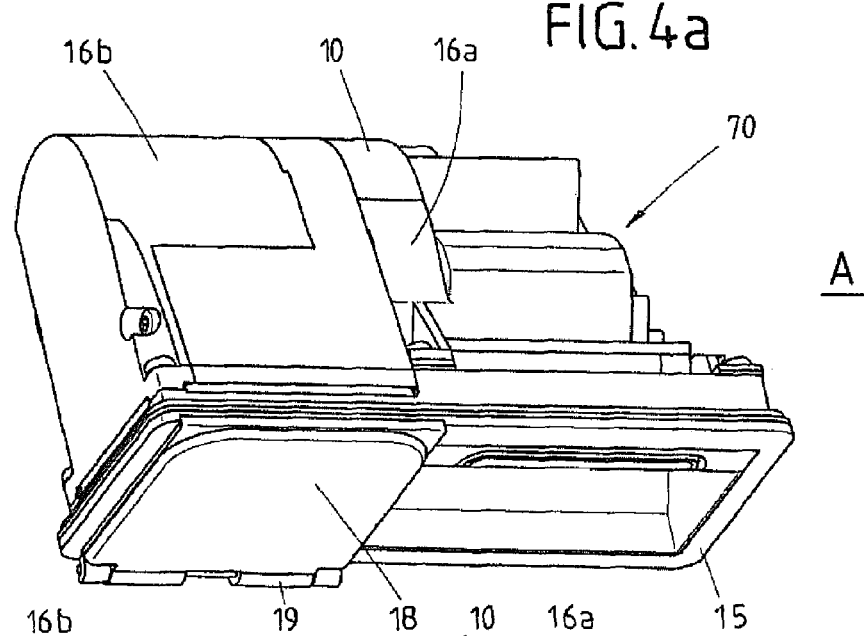

FIG. 1 shows a device according to the invention with a slide 20 which can replaceably receive a camera 60 and comprise a gear 30 which can move the slide 20 between a rest position A and an operating position B. The gear 30 comprises an arm 40 and a rocking element 50 wherein the rocking element 50 is jointly connected with the slide 20. The arm 40 and the rocking element 50 are pivotably assembled at a housing 10 using a first 11 and a second joint 12. The joints 11, 12 can thereby be configured in form of pins or screws. The slide 20 is swingable using a third joint 13 at the rocking element 50. By the three joints 11, 12, 13 the slide 20 can be partly moved and partly tilted between the rest position A and the operating position B. The slide 20 thereby comprises a mounting opening 24 through which different cameras 60 can be received in the slide 20. For a secure acceptance of the camera 60 the slide can be configured in a way that the camera 60 is held form and/or force fitting and/or with the help of latching and/or clamping elements.

The FIG. 1 shows the slide 20 in a retracted rest position A in which the camera 60 is assembled and protected within the housing 10 by the lid element 18 which closes an opening 17 in a housing lid 15. In the operating position B of the slide 20 the camera 60 can extend in an extended state through the opening 17 towards the outside. The lid element 18 is detachably assembled at the housing lid 15 by a swivel joint 19 and can be moved along with the slide 20 between an open position and a closing position, when the slide 20 moves between a rest position A and an operating position B not shown in FIG. 1.

The housing 10 comprises a first housing part 16a and a second housing part 16b, which is not shown in FIG. 1, which can be screwed to one another and with the housing lid 15. According to the invention, a protecting membrane 9 can be intended in order to seal the inside of the housing 10. The protecting membrane 9 can be configured bellow-like and/or tube-like. Thereby one edge of the protecting membrane 9 can be assembled at the outside of the housing 10. The protecting membrane 9 can thereby be clamped and/or screwed and/or glued between the housing lid 15 and the first 16a and/or the second housing part 16b. The protecting membrane 9 thereby seals the space between the opening 17 and the slide 20 that no moisture or dirt particles can penetrate into the inside of the housing 10. The other edge of the protecting membrane 9 can be tensed about the slide 20 at the edge of the not shown acceptance opening 25 for the camera 60.

The gear 30 comprises a first axis 1 immobile assembled at the housing 10 about which the arm 40 can be moved and a second axis 2 immobile assembled at the housing 10 about which the rocking element 50 can be moved. The first axis 1 thereby proceeds parallel to the second axis 2 wherein the slide 20 can perform a swinging movement S to one part together with the rocking element 50 about the axis 2. The first axis 1 proceeds according to the invention through the first joint 11 at the second axis 2 through the second joint 12. The slide 20 is assembled at the rocking element 50 with the help of the third joint 13 like previously described wherein at both sides of the slide 20 each a third swivel joint 13 is assembled. The extension direction between both swivel joints 13 is determined by a third axis 3 at the rocking element 50 with which the rocking element 50 moves along or moves about the second axis 2. Thereby, the third axis extends always parallel to the first 1 and to the second axis 2. Thereby, the slide 20 can be moved likewise about a second axis 2 together with the rocking element 50. At the same time during the swinging movement S of the slide 20 about the second axis 2 or sequential to the swinging movement S the slide 20 can tilt about a third axis 3. At least partially, the swinging movement S and the tilting movement K of the slide 20 can be determined by a not shown housing guidance 14 in the housing 10, in which a sliding element 21 of the slide 20 can be guided. Further, the housing guidance 14 of the housing 10 can serve for stabilizing the movement of the slide 20 between the rest position A and the operating position B. The movement of the slide 20 which is composed from a swinging movement S about the second axis 2 and the tilting movement K about the third axis 3 enables to minimize the necessary construction space for the storage and for the guidance of the slide 20 within the housing 10.

The arm 40 comprises according to the invention a drive guidance 44 which can interact with a drive element 71 of a drive 70 in order to move the arm 40. The drive 70 therewith moves the whole gear 30 wherein the effect on the arm 40 is transmitted via a steering guidance 54 at the rocking arm 52 of the rocking element 50 to the rocking element 50 and via the third joint 13 also on the slide 20. The drive 70 is for example shown as a cog wheel drive. The drive guidance 44 is according to the alternative embodiment shown as a groove in a member of the arm 40. Alternatively it is possible that the drive guidance 44 is configured as a slotted guide and/or as a track inside at the member of the arm 40. The drive guidance 44 is according to the invention arch-like. The steering guidance 54 of the rocking element 50 can likewise be configured as a slotted guide, a groove or a track at the rocking arm 52. According to the present invention the steering guidance 54 is configured S-like in order to on the one hand cause that the rocking element 50 can be moved about the second axis 2 and on the other hand enable a tilting movement K of the slide 20 about a third axis 3.

In a first drive phase I which is described in detail in the description of FIGS. 2a to 2c the drive element 71 driven by the drive 70 can be moved from a housing side stop 44a to a gear side stop 44b without moving the gear 30. Subsequently, in a second driving phase II the drive element 71 pushes to the gear side stop 44b and moves the arm 40 about the first axis 1. A steering element 41 of the arm 40 which is guided in a steering guidance 45 of the rocking element 55 thereby processes in the steering guidance 54 from a lower stop 54a to an upper peak 54s of the steering guidance 54 and thereby acts together with the steering guidance 54 in a way that the rocking element 50 is moved about the second axis 2. In the third drive phase III the drive element 71 reaches the gear side stop 44b of the drive guidance 44. Subsequently, the drive element 71 has an effect together with the drive guidance 44 in a way that the steering element 41 further proceeds from the upper peak 54s in a lower peak 54f of the steering guidance 54. This effects that the rocking element 50 further moves about the axis 2. At the same time the drive element 71 proceeds backwards from the gear side stop 44b in the direction to the center of the drive guidance 44. Subsequently in a fourth drive phase IV the drive element 71 reaches the center of the drive guidance 44, the steering element 41 an upper peak 54b of the steering guidance 54 wherein the rocking element 50 further moves about the second axis 2. Thereby the rocking element 50 proceeds about the second axis 2 with an increasing pivoting radius depending on the position of the steering element 41 in the steering guidance 54. During these four driving phases II, III and/or IV which are shown in detail in FIGS. 2a, 2b and 2c the slide 20 proceeds together with the rocking element 50 about the second axis 2 and further performs another swinging movement S or a tilting movement K about the third axis with a pivoting radius which corresponds to the distance between the joint 13 and the sliding element 21. Thereby the swinging movement S and the tilting movement K of the slide 20 can be determined by the housing guidance 14 in the housing 10 with which the sliding element 21 of the slide 20 can interact.

FIGS. 2a, 2b and 2c show a lateral view of how the gear 30 according to the invention drives the slide 20 between the rest position A of FIG. 2a and the operating position B of FIG. 2c. During the first drive phase I the drive element 71 slides in the drive guidance 44 from a housing side stop 44a of the drive guidance 44 to a gear side stop 44b without moving the gear 30. During the second drive phase II the drive element 71 acts on the gear side stop 44b in a way that a steering element 41 of the arm 40 moves from a lower stop 54a of the steering guidance 54 at the rocking element 50 to an upper peak 54s, and that the sliding element 21 of the slide 20 along the housing guidance 15 moves from a posterior stop 14a until approximately to the center of the housing guidance 14. During the third drive phase III the steering element 41 acts together with the steering guidance 54 in a way that the steering element 41 moves from the lower peak 54f to an upper peak 54s of the steering guidance 54. Thereby, the drive element 71 moves from a gear side stop 44b a small part backwards in the direction of the housing side stop 44a in the drive guidance 44. Meanwhile the sliding element 21 moves along the sliding guidance 14 from approximately the center of the housing guidance 14 to an anterior stop 14b. Finally, in the fourth drive phase IV the steering element 41 acts with the steering guidance 54 together in a way that the steering element 41 moves from an upper peak 54s to an upper stop 54b of the steering guidance 54. Thereby the drive element 71 moves further backwards in the direction of a housing side stop 44a until approximately the center of the drive guidance 44 wherein the sliding element 21 rests at the anterior stop 14b of the housing guidance 14. This assembly of the arm 40 with the drive guidance 44 and the rocking element 50 with the steering guidance 54 it is subsequently further described in detail in the description of FIG. 5.

During the drive phases II to IV the leverage affects also the slide 20 produced by the steering element 41. The steering element 41 which acts on the steering guidance 45 at the rocking arm 52 of the rocking element 50 thereby creates a turning moment at the rocking element 50 which is further transmitted also to the slide 20. The slide 20 there-with experiences a turning moment with a lever arm which comprises a length equal to the distance between the joint 13 and the sliding element 21. During the drive phases 2 to 4 the slide 20 moves also together with the rocking element 50 with an alterable pivoting radius which corresponds to the distance between the second joint 12 and the position of the steering element 41 of the arm 40 in the steering guidance 54 of the rocking element 50. The alterable pivoting radius can further be determined at least partially by the orientation and the form of the housing guidance 14. The housing guidance 14 can further lead to stabilizing the swinging movement S of the slide 20. At the same time of the swinging movement S the slide 20 performs a tilting movement K about the third axis 3 with a pivoting lever which is determined by the position of the sliding element 21 in the housing guidance 14 and the position of the third joint 13. The sliding element 21 can be configured as a cam and/or as a cog which can slide and/or roll off in the housing guidance 14. The sliding element 21 can be assembled at an upper rear side 22 of the slide 20 and the third joint 3 at a lower rear side 23 of the slide 20.

The device according to the invention thereby comprises a housing 10 which incorporates the gear 30 and comprises an opening 17 in the housing lid 15 through which the slide 20 can extend in the operating position B of FIG. 2c. The opening 17 in the housing 10 is closed with a lid element 18 in the rest position A in FIG. 2a. The lid element 18 can thereby cover and protect the camera 60 in the rest position A. The lid element 18 is pivotably and detachably assembled at the housing 10 via a swivel joint 19 wherein the lid element 18 can be pushed open and/or be retracted without a drive by the slide 20. The lid element 18 is thereby in an operative connection with the slide 20 via a detachable connecting element 26.

Figure 4B:
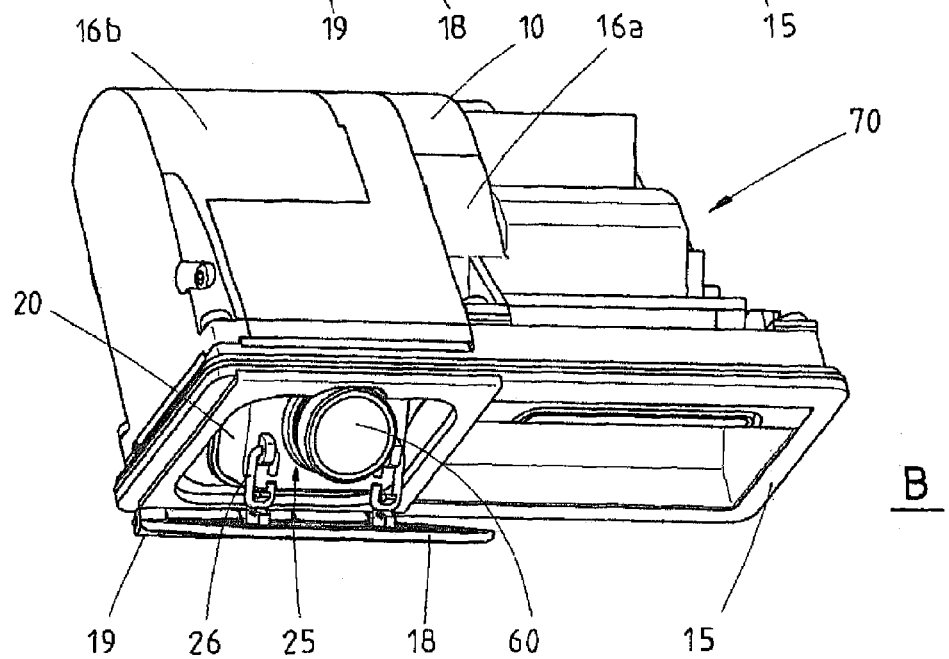

The FIGS. 3a, 3b and 4a, 4b show a device according to the invention in a perspective view from the top and from the bottom wherein the FIGS. 3a and 4a show the device in a rest position A of the slide 20 and the FIGS. 3b and 4b show the device in an operating position B. The device comprises a housing 10 which comprises a housing lid 15 which extends outside the vehicle to the outside. In the housing lid 15 an opening 17 is intended through which a movable slide 20 can be moved from the rest position A into the operation position B, wherein in the operating position B the camera 60 which is replaceably accommodated in the slide 20 can extend through the opening 17 and can visually register the outer area of the vehicle. The slide 20 comprises at this side an acceptance opening 25 through which the objective of the camera 60 can extend. At the housing lid 15 a lid element 18 is assembled which covers the opening 17 in the rest position A of the slide 20. Herein, the lid element 18 is detachably assembled at the housing 10 via a swivel joint 19. At the inside of the housing 10 which is shown in FIGS. 3a and 3b the housing 10 is configured with another opening through which the camera 16 can be inserted during the mounting in an acceptance opening 25 of the slide 20. Thereby, the camera 16 can be kept slip resistantly in the slide 20 via a form and/or force fit or via latching elements. The housing 10 can enclose a gear 30 and a drive 70 wherein the gear 30 serves for driving the slide 20. The gear 70 is configured as a gear drive with a drive element 71 which engages in a drive guidance 44 at an arm 40 of the gear 30 and the arm 40 is pivotably moved about a first axis 1. Hereby, the arm 40 transmits the movement to a rocking element 50 of the gear 30 and further to the slide 20. The gear 30 is configured according to the invention in a way that the slide 20 can perform a swinging movement S about a second immovable axis 2 and a tilting movement K about a third movable axis 3 between the rest position A and the operating position B.

The arm 40 and the rocking element 50 are assembled pivotably at a first housing part 16a of the housing 10 via two joints 11, 12 corresponding about a first axis 1 and a second axis 2. A second housing part 16b not shown in FIGS. 3a and 3b can comprise a further second joint 12 for the pivotably mounting of the rocking element 50. Advantageously the gear 30 and the arm 40 and the rocking element 50 and the therewith connected slide 20 can be initially assembled at the first housing part 16a wherein subsequently the second housing part 16b can be assembled as a cover covering the gear 30 with said components 40, 50 and 20.

FIG. 5 schematically shows the arm 40 and the rocking element 50, which are in a mechanical operative connection with one another. The arm 40 is thereby pivotably mounted about the first axis 1 and the rocking element 50 pivotably about the second axis 2. The arm 40 is thereby driven by the engagement of the drive element 71 in the drive guidance 44. The drive guidance 44 is formed arc-like according to the invention in order to perform a swinging movement of the arm 40. During the first drive phase I, like shown in the description of FIG. 2a, the drive element 71 moves from a housing side stop 44a to a gear side stop 44b of the drive guiding 44 wherein the arm 40 not yet moves. If the drive element 71 pushes in the second drive phase II of FIG. 2b on the gear side stop 44b, the arm 40 can be moved wherein the steering element 41 of the arm 40 can influence the steering guidance 54 of the rocking element 50. The further the steering element 41 moves in the steering guidance 54, the greater is the pivoting radius with which the swinging movement is transmitted to the rocking element 50. In the second drive phase II the steering element 41 passes through a first section of the steering guidance 54 between a lower stop 54a and an upper peak 54s of the steering guidance 54. In a third drive phase III the steering element 41 moves further into the steering guidance 54 until a lower peak 54f and subsequently in the fourth driving phase IV until an upper stop 54b of the steering guidance 54. The steering guidance 54 is advantageously performed in a way that not only the rocking element 50 can perform a swinging movement S with an increasing radius, but also the slide 20 wherein the slide 20 additionally in the fourth drive phase IV can perform a tilting movement K at least partially caused by the performance of the steering guidance 54 between the lower peak 54f and the upper stop 54b of the steering guidance 54. The tilting radius about which the slide 20 can be moved can at least partially be determined by the distance between a third axis 3 and the sliding element 21 of the slide 20 which sliding element 21 performs in a housing guidance 14 shown in FIGS. 2a to 2c.

FIG. 6 shows that the housing 10 comprises at least a third 16a and a second housing part 16b and a housing lid 15. The method according to the invention for the mounting of the device shown in FIGS. 1 to 4b can thereby intend that in a first step the gear 30 and the slide 20 are guided in a first mounting direction M, like shown in FIG. 6, towards the inside of the first housing part 16b and can be assembled at the inside of the first housing part 16a. Subsequently, in a second step the second housing part 16b can be guided in the first mounting direction M to the first housing part 16a and be assembled with the first housing part 16a in a way that a swinging movement S and/or a tilting movement K of the slide 20 can be performed between the rest position A and the operating position B like shown in FIGS. 2b to 2c. The second housing part 16b can thereby be performed with a second joint 12 and a housing guidance 14, symmetrically to the second joint 12 and to the housing guidance 14 of the first housing part 16a. Thus, the rocking element 50 can be pivotably received double sided at both housing parts 16a, 16b wherein the slide 20 can comprise a sliding element 21 at each side respectively which can be guided at both sides of the slide 20 in the respective complementary housing guidance 14. Thereby, the first and the second step can be sequentially performed. Alternatively it is likewise possible that the first and the second step can at least partially occur at the same time. Such an assembly of the gear 30 at only a first housing part 16 which is initially accessible from all sides facilitates the mounting of the components 30, 40, 50 and 20. Wherein the second housing part 16b after the completed mounting of the gear 30 only has to be placed on the first housing part 16a. The second housing part 16b can be assembled by screws and/or by latching elements and/or form and/or force fittingly at the first housing part 16a. Subsequently, in a third mounting step or between the first and the second mounting step the housing lid 15 shown in FIGS. 1 to 4b can be assembled by screws and/or by latching elements and/or form and/or force fittingly on the first housing part 16a and/or on the second housing part 16b.

When during the operation of the device or the camera 60 a maintenance of one of the components 30, 40, 50 or 20 or the camera 60 becomes necessary, the maintenance can be performed without completely demounting the device. Hereby, in a simple manner only the second housing part 16b can be demounted, so that an easy access to the component parts 30, 40, 50 and 20 of the device and/or of the mounting opening 24 of the slide 20 is ensured during the exchange or repair of the camera 60. Further, it is an advantage that the device according to the invention can be completed and assembled also without camera 60 wherein it can be left to the vehicle manufacturer or user to insert the desired camera into the device.

Advantageously, the lid element 18 can easily fall off from the swivel joint 19 during an accident or a collision with another vehicle or another object or a user in order not to transmit the impact to the device and not to damage the other vehicle or the other object or not to injure the user. According to the invention, the lid element 18 does not require a particular drive. The lid element 18 can be lifted between the opening position and the closing position according to the opening 17 by the slide 20 wherein the slide 20 comprises a detachable connecting element 26 to the lid element 18.

According to the invention, further a protecting membrane not shown in FIGS. 2a to 4b can be intended in order to seal the free space between the opening 17 and the housing 10 and the slide 20. The protecting membrane 9 can advantageously avoid the penetration of dirt particles or moisture into the housing 10 and protect the camera 60 from weather influences. The protecting membrane 9 can, like previously shown in FIG. 2, also be configured as a bellow membrane. The protecting membrane 9 can be performed from an elastic material wherein during the movement of the slide 20 the protecting membrane can be deformed. The protecting membrane can in a further mounting step or between the first and the second or between the second and the third step be assembled at the slide 20 and at the housing lid 15. Likewise it is possible, that the protecting membrane 9 can be assembled on the slide 20 previous to the first mounting step for example by a clamping ring outside of the acceptance opening 25 wherein subsequently during the mounting of the housing lid 15 a second edge of the protecting membrane 9 can be clamped between the housing lid 15 and/or the first housing part 16*a* and/or the second housing part 16*b* and particularly be glued at the housing lid 15 at the edge of the opening 17.

Further it can be intended that the opening 17 can be equipped from the outside to the housing lid 15 with a collar element from elastic material at which the lid element 18 can be absorbed in order to avoid closing noises when the slide 20 moves back into the rest position A.

The housing 10 of the device and/or the gear 30 and/or the slide 20 and/or the arm 40 and/or the rocking element 50 can for example be configured from plastic and can be produced by a forming process like form molding or injection molding. The housing 10 and the gear 30 including the arms 40 and the rocking element 50 can be configured from a first material and the protecting membrane 9 and the collar element from a second material wherein the first material comprises a higher hardness degree than the second material.

All features and/or advantages described in the claims, the description or the drawings including the constructive details and the spatial arrangement can be essential according to the invention in single or in different combinations, particularly based on FIGS. 1 to 6.

REFERENCE LIST

1 First axis
2 Second axis
3 Third axis
9 Protecting membrane
10 Housing
11 First joint
12 Second joint
13 Third joint
14 Housing guidance
14*a* Posterior stop of the housing guidance
14*b* Anterior stop of the housing guidance
15 Housing lid
16*a* First housing part
16*b* Second housing part
17 Opening in the housing
18 Lid element
19 Swivel joint of the lid element
20 Slide
21 Sliding element
22 Upper rear side of the slide
23 Lower rear side of the slide
24 Mounting opening
25 Acceptance opening
26 Detachable connection element of the lid element 18
30 Gear
40 Arm
41 Steering element
44 Drive guidance
44*a* Housing side stop of the drive guidance
44*b* Gear side stop of the drive guidance
50 Rocking element
52 Rocking arm
54 Steering guidance
54*a* Lower stop of the steering guidance
54*s* Upper peak of the steering guidance
54*f* Lower peak of the steering guidance
54*b* Upper stop of the steering guidance
60 Camera
70 Drive
71 Drive element
A Rest position
B Operating position
K Tilting movement of the slide 20
S Swing movement of the slide 20
I First drive phase
II Second drive phase
III Third drive phase
IV Fourth drive phase

The invention claimed is:

1. Device for holding a camera with
a housing in which a slide is movable accepted at which the camera can be assembled wherein the slide can be driven by a gear,
which gear comprises an arm which is movably mounted about a first axis and is in a mechanical operative connection with a rocking element which is movably mounted at the housing about a second axis, wherein each of the first axis and the second axis is fixedly attached to the housing,
wherein the slide is movably mounted at the rocking element about a third axis,
wherein the rocking element comprises a steering guidance which interacts with a steering element of the arm in order to move the rocking element about the second axis and the slide about the third axis wherein the steering guidance is performed S-like, and
wherein the movement of the slide between a rest position and an operating position is at least partially determined by a housing guidance of the housing.

2. Device according to claim 1,
wherein the slide comprises a housing side mounting opening in order to replaceably accept a camera or an acceptance opening extending towards the outside through which the camera is directed to the outside.

3. Device according to claim 1,
wherein the arm is mounted at the housing via a first joint and the rocking element is mounted at the housing via a second joint and wherein the first axis proceeds through the first joint and the second axis through the second joint.

4. Device according to claim 1,
wherein the first axis is parallel to the second axis.

5. Device according to claim 1,
wherein the slide is assembled at the rocking element via a third joint wherein the third axis proceeds through the third joint.

6. Device according to claim 1,
wherein the third axis is movable to the first axis and to the second axis with the rocking element.

7. Device according to claim 1,
wherein the slide comprises a sliding element which is displaceable along the housing guidance of the housing wherein the housing guidance is shaped arch-like.

8. Device according to claim 1,
wherein the arm comprises a driving guidance which interacts with a driving element of a drive in order to move the arm about the first axis wherein the drive guidance is shaped arch-like.

9. Device according to claim 1,
wherein the gear is performed in a way that the slide performs partly a swinging movement about the second axis and partly a tilting movement about a third axis and that the swinging movement from the rest position into the operating position can be performed with an alterable radius which is determined by the steering guidance.

10. Device according to claim 9,
wherein the gear is configured in a way that during the tilting movement the swinging movement of the slide about a second axis is blocked and that the gear is configured in a way that the swinging movement and a tilting movement can at least partially occur at the same time.

11. Device according to claim 1,
wherein the housing comprises an opening through which the slide extends in the operating position.

12. Device according to claim 11,
wherein the slide and a Rd element are in a mechanical operative connection and during the movement from the rest position into the operating position the slide actuates the lid element wherein the slide comprises at least a pestle or the slide is detachably connected with the lid element in a form or force fitting manner.

13. Device according to claim 11,
wherein a protecting membrane is intended which sealingly closes the free space between the opening in the housing and the slide in order to avoid the penetration of dirt particles or moisture into the housing.

14. Device according to claim 11,
wherein the opening comprises a collar element at which the lid element rests when the slide is in the rest position, and
wherein the collar element is configured from an elastic material.

15. Device according to claim 11,
wherein a lid element is intended that closes the opening in the rest position of the slide,
wherein the lid element is pivotably or detachably mounted at the housing via a swivel joint or form fittingly or force fittingly.

16. Method for mounting of a device according to claim 1 for the acceptance of a camera
a housing in which a slide is movably accepted at which the camera can be assembled,
wherein the housing covers at least a first and a second housing part,
wherein the slide can be driven by the gear,
which gear comprises the arm which is pivotably mounted about the first axis at the housing and which is in a mechanic operating connection with the rocking element which is pivotably mounted at the housing about the second axis,
wherein each of the first axis and the second axis is fixedly attached to the housing wherein the slide is pivotably mounted about the third axis at the rocking element wherein the rocking element comprises the steering guidance which interacts with the steering element of the arm in order to move the rocking element about the second axis and the slide about the third axis wherein the steering guidance is performed S-like,
wherein the movement of the slide between the rest position and the operating position is at least partially determined by the housing guidance of the housing, and
wherein the mounting comprises the following steps:
in a first step the gear and the slide are guided in a first mounting direction towards the inside of the first housing part and are assembled at the inside of the first housing part; and
in a second step the second housing part is guided in the first mounting direction to the first housing part and is assembled with the first housing part in a way that a swinging or tilting movement of the slide can be performed between the rest position and the operating position.

17. Method according to claim 16,
wherein the first and the second step are performed sequentially or that the first and the second step are performed at least partially at the same time.

18. Method according to claim 16,
wherein in a third step a housing lid is assembled at the first or the second housing part.

19. Method according to claim 16,
wherein a protecting membrane is assembled at the slide wherein the protecting membrane is assembled between the housing lid and at least one of both housing parts.

* * * * *

UNITED STATES PATENT AND TRADEMARK OFFICE
CERTIFICATE OF CORRECTION

PATENT NO. : 9,751,471 B2  
APPLICATION NO. : 14/434106  
DATED : September 5, 2017  
INVENTOR(S) : Heiko Schütz Page 1 of 1

It is certified that error appears in the above-identified patent and that said Letters Patent is hereby corrected as shown below:

In the Claims

In Claim 12, Column 15, at Line 12, "Rd" should be changed to --lid--.

Signed and Sealed this  
Thirteenth Day of March, 2018

Andrei Iancu  
*Director of the United States Patent and Trademark Office*